United States Patent
Ma et al.

(10) Patent No.: US 12,340,251 B2
(45) Date of Patent: Jun. 24, 2025

(54) SCHEDULING METHOD AND DEVICE BASED ON DEEP LEARNING NODE COMPUTATION, AND STORAGE MEDIUM

(71) Applicant: SHENZHEN CORERAIN TECHNOLOGIES CO., LTD., Guangdong (CN)

(72) Inventors: Kai Ma, Guangdong (CN); Chao Xiong, Guangdong (CN); Xinyu Niu, Guangdong (CN); Kuen Hung Tsoi, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 519 days.

(21) Appl. No.: 17/790,667

(22) PCT Filed: Dec. 31, 2020

(86) PCT No.: PCT/CN2020/142198
§ 371 (c)(1),
(2) Date: Jul. 1, 2022

(87) PCT Pub. No.: WO2021/136512
PCT Pub. Date: Jul. 8, 2021

(65) Prior Publication Data
US 2023/0034881 A1    Feb. 2, 2023

(30) Foreign Application Priority Data
Jan. 3, 2020 (CN) .......................... 202010004459.4

(51) Int. Cl.
*G06F 9/50* (2006.01)
*G06F 9/48* (2006.01)

(52) U.S. Cl.
CPC .......... *G06F 9/5044* (2013.01); *G06F 9/4881* (2013.01); *G06F 9/5016* (2013.01)

(58) Field of Classification Search
CPC ..................................................... G06F 9/5044
See application file for complete search history.

(56) References Cited

U.S. PATENT DOCUMENTS 11,523,546 B1 * 12/2022 Byagowi ............ H05K 7/20745
2010/0030716 A1    2/2010 Calise et al.
(Continued)

FOREIGN PATENT DOCUMENTS

| CN | 108292241 A | 7/2018 |
| CN | 109885388 A | 6/2019 |

(Continued)

OTHER PUBLICATIONS

Peck et al, Hardware/Software co-design of operating system services for thread management and scheduling. Proceedings of the 25th IEEE International Real-Time Systems Symposium, Works in Progress Session (RTSS WIP), Lisbon, Portugal. 2004 (Year: 2004).*

(Continued)

*Primary Examiner* — Charlie Sun

(57) ABSTRACT

Provided are a scheduling method and apparatus based on a deep learning node computation, and a storage medium. The scheduling method includes: a to-be-computed node of a preset neural network computation graph is acquired; a node type of the to-be-computed node is determined, where the node type includes a hardware computation node and a software computation node; in a case where the node type is the hardware computation node, the hardware computation node is scheduled to a first queue, and whether a hardware computing power module corresponding to the hardware computation node is occupied or not is determined; and in a case where the hardware computing power module is not occupied, the hardware computation node is input into the hardware computing power module for computing.

9 Claims, 3 Drawing Sheets

(56) References Cited

U.S. PATENT DOCUMENTS

| | | |
|---|---|---|
| 2015/0324684 A1 | 11/2015 | Alvarez-Icaza Rivera et al. |
| 2019/0235790 A1* | 8/2019 | Koo .................... G06F 21/78 |
| 2019/0266504 A1 | 8/2019 | Apparao |

FOREIGN PATENT DOCUMENTS

| | | |
|---|---|---|
| CN | 111190741 A | 5/2020 |
| WO | 2018076238 A1 | 5/2018 |

OTHER PUBLICATIONS

Chen, Andrew Tzer-Yeu, et al. "Convolutional neural network acceleration with hardware/software co-design." Applied Intelligence 48 (2018): 1288-1301. (Year: 2018).*

PCT/CN2020/142198 International Search Report dated Apr. 12, 2021.

* cited by examiner

SCHEDULING METHOD AND DEVICE BASED ON DEEP LEARNING NODE COMPUTATION, AND STORAGE MEDIUM

CROSS-REFERENCES TO RELATED APPLICATIONS

This is a National Stage Application, filed under 35 U.S.C. 371, of International Patent Application No. PCT/CN2020/142198, filed on Dec. 31, 2020, which is based on and claims priority to Chinese Patent Application No. 202010004459.4, filed with the China National Intellectual Property Administration (CNIPA) on Jan. 3, 2020, disclosure of which is incorporated herein by reference in its entirety.

TECHNICAL FIELD

Embodiments of the present application relate to a deep learning technology, and for example, to a scheduling method and apparatus based on a deep learning node computation, and a storage medium.

BACKGROUND

A deep learning is a branch of a machine learning, and is an algorithm for performing a characterization learning on data by using an artificial neural network as a framework. A deep learning network is typically trained by algorithms. In most cases, an algorithm developer tends to use an existing open deep learning framework for a model training, and most of open deep learning frameworks are designed for computing devices such as a central processing unit (CPU)/graphics processing unit (GPU). The CPU/GPU adopts a conventional instruction set architecture, and this architecture has a low efficiency and a high flexibility.

With the development of the deep learning related technology, the demand for computing power in the deep learning related technology is higher and higher at present. The defect of low efficiency of the conventional instruction set architecture cannot satisfy the requirements of an application scenario. In contrast, a data flow architecture is higher in efficiency, and is more suitable for the development trend of the deep learning technology from a technical route. However, large differences exist between a data expression of the data flow architecture and a data expression of the instruction set architecture: an operator granularity of the data flow architecture is much greater than that of the instruction set architecture; before a computation of a data flow architecture operator, an arrangement sequence of a computation module is determined in advance according to a data dependence. Due to the difference, a data flow chip is only suitable for a deep learning operator, and some places with a high customization degree still need a general computing device for an auxiliary processing. The existence of a software node leads to following cases: the software node has no the hardware acceleration effect and runs slowly; when a graph computation is run in a case of a single thread, a running of the software node may cause a hardware to be idle, and thus the acceleration is not facilitated.

SUMMARY

Embodiments of the present application provide a scheduling method and apparatus based on a deep learning node computation, and a storage medium, so as to realize the asynchronization of a graph reasoning process and fully utilize resources of software and hardware.

An embodiment of the present application provides a scheduling method and apparatus based on a deep learning node computation, and a storage medium. The scheduling method based on the deep learning node computation includes: a to-be-computed node of a preset neural network computation graph is acquired; a node type of the to-be-computed node is determined, where the node type includes a hardware computation node and a software computation node; in a case where the node type is the hardware computation node, the hardware computation node is scheduled to a first queue, and whether a hardware computing power module corresponding to the hardware computation node is occupied or not is determined; and in a case where the hardware computing power module is not occupied, the hardware computation node is input into the hardware computing power module for computing.

In one aspect, an embodiment of the present application further provides a scheduling device based on a deep learning node computation, and the device includes: at least one processor and a storage apparatus. The storage apparatus is configured to store at least one program, where the at least one program, when executed by the at least one processor, causes the at least one processor to implement the scheduling method provided in any one of the embodiments of the present application.

In another aspect, an embodiment of the present application further provides a computer-readable storage medium, having stored thereon a computer program, where the computer program, when executed by a processor, implements the scheduling method of any one of the embodiments of the present application.

DETAILED DESCRIPTION

Figure 1:
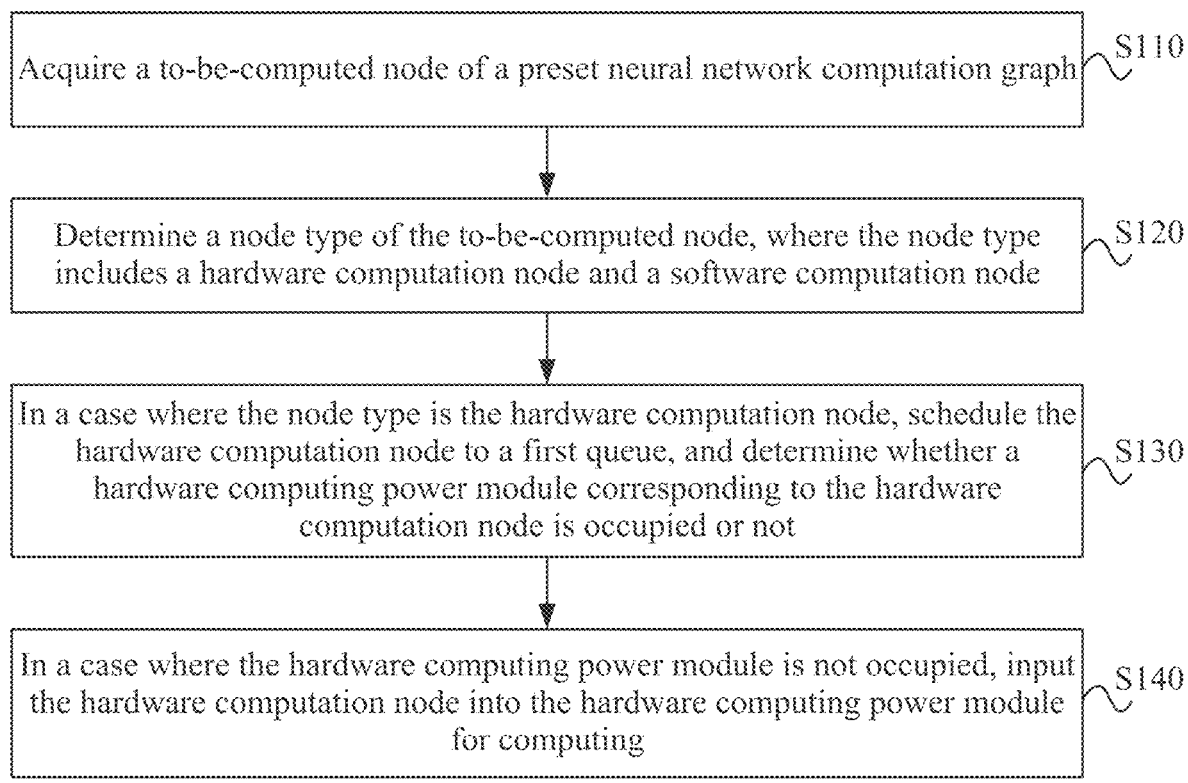
FIG. 1 is a flowchart of a scheduling method based on a deep learning node computation provided in an embodiment of the present application.

Before the exemplary embodiments are discussed in more detail, it should be noted that some exemplary embodiments are described as processes or methods depicted as flowcharts. Although the flowchart describes steps as a sequential process, most of the steps may be implemented in parallel, concurrently or simultaneously. Moreover, an order of the steps may be rearranged. A process may be terminated where its operations are completed, but may also have additional steps not included in the drawings. The process may correspond to a method, a function, a procedure, a subroutine, a subprogram and the like. As shown in FIG. 1, an embodiment of the present application provides a scheduling method based on a deep learning node computation, and the scheduling method based on the deep learning node computation includes step S110 to step S140. In step S110, a to-be-computed node of a preset neural network computation graph is acquired. In this embodiment, a neural network is a complex network system formed by widely interconnecting a large number of simple processing units (also referred to as neurons), which reflects many of the basic features of the human brain function, and is a highly complex nonlinear dynamic learning system. In a computation graph of an actual computation process of the neural network, a simplest computation unit is referred to as a computation node, and each computation node which is not computed is a to-be-computed node. The to-be-computed node of the preset neural network computation graph is acquired. That is, a to-be-computed node in a neural network computation graph needing to be computed is inserted into a computation queue in a device. In an embodiment, the computation queue is an asynchronous queue, that is, when a certain to-be-computed node is computed in the computation queue, a computation is directly performed without waiting for instruction information returned by other processes, and when the instruction information is returned, the computation is performed according to the instruction information. In step S120, a node type of the to-be-computed node is determined, where the node type includes a hardware computation node and a software computation node.

In an embodiment, the hardware computation node is a computation node where the hardware computing power module may perform the computation, and the software computation node is a computation node where the hardware computing power module cannot perform the computation. The hardware computing power module may include multiple artificial intelligence (AI) computing power chips, the AI computing power chip employs a data flow architecture, and may only perform the computing for a specific computation node, but the AI computing power chip is very high in computation efficient.

In step S130, in a case where the node type is the hardware computation node, the hardware computation node is scheduled to a first queue, and whether a hardware computing power module corresponding to the hardware computation node is occupied or not is determined.

In this embodiment, the first queue is a hardware node queue, and all to-be-computed nodes entering the first queue are hardware calculation nodes. Each AI computing power chip in the hardware computing power module may be designed for computing different hardware computation nodes, and in a case where the to-be-computed node is the hardware computation node, whether an AI computing power chip corresponding to the hardware computation node is occupied or not needs to be determined.

In step S140, in a case where the hardware computing power module is not occupied, the hardware computation node is input into the hardware computing power module for computing.

In an embodiment, in a case where the to-be-computed node is the hardware computation node, and when an AI computing power chip corresponding to the hardware computation node is not occupied, the hardware computation node is input into the hardware computing power module and the AI computing power chip corresponding to the hardware computation node for computing.

Figure 2:
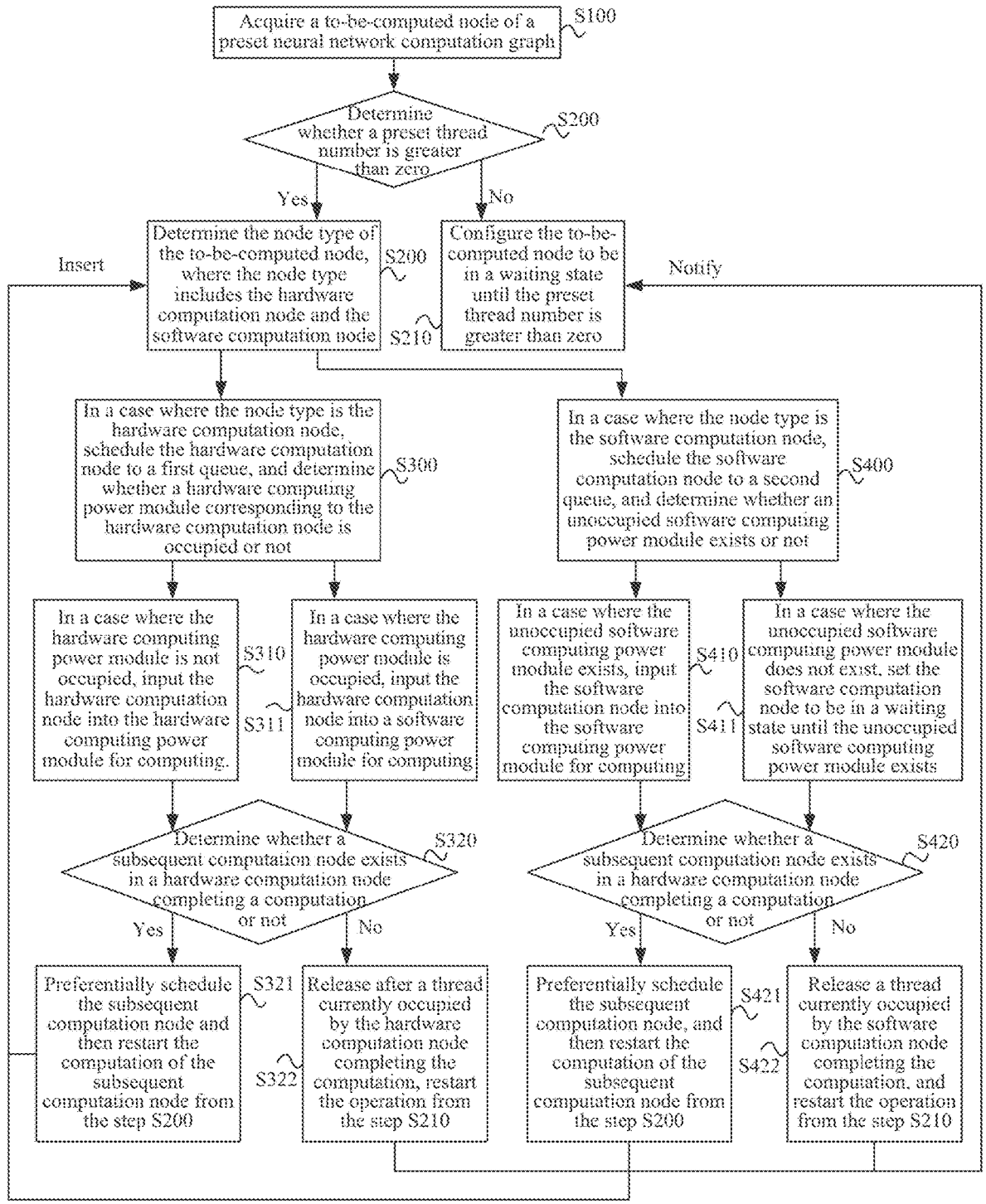
FIG. 2 is a flowchart of a scheduling method based on a deep learning node computation provided in an embodiment of the present application.

According to the embodiments of the present application, the to-be-computed node of the preset neural network computation graph is acquired; the node type of the to-be-computed node is determined, where the node type includes the hardware computation node and the software computation node; in a case where the node type is the hardware computation node, the hardware computation node is scheduled to the first queue, and whether the hardware computing power module corresponding to the hardware computation node is occupied or not is determined; and in a case where the hardware computing power module is not occupied, the hardware computation node is input into the hardware computing power module for computing, so that a case that a software node does not have a hardware acceleration effect, the hardware is idle during running, and the acceleration is not facilitated is avoided, and meanwhile, the effects of asynchronization of the computation process of the neural network computation graph and full utilization of software and hardware resources are realized. As shown in FIG. 2, an embodiment of the present application is refined on the basis of the above embodiment, and an embodiment of the present application provides a scheduling method based on a deep learning node computation, and the scheduling method based on the deep learning node computation includes step S100 to step S422.

In step S100, a to-be-computed node of a preset neural network computation graph is acquired. In this embodiment, a neural network is a complex network system formed by widely interconnecting a large number of simple processing units (also referred to as neurons), which reflects many of the basic features of the human brain function, and is a highly complex nonlinear dynamic learning system. In a computation graph of an actual computation process of the neural network, a simplest computation unit is referred to as a computation node, and each computation node which is not computed is a to-be-computed node. The to-be-computed node of the preset neural network computation graph is acquired, that is, a to-be-computed node in a neural network computation graph needing to be computed is inserted into a computation queue in a device. In an embodiment, the computation queue is an asynchronous queue, that is, when a certain to-be-computed node is computed in the computation queue, a computation is directly performed without waiting for instruction information returned by other processes, and when the instruction information is returned, the computation is performed according to the instruction information. In step S200, whether a preset thread number is greater than zero is determined, and the node type of the to-be-computed node is determined in a case where the preset thread number is greater than zero, where the node type includes the hardware computation node and the software computation node.

In an embodiment, an operation of determining whether the preset thread number is greater than zero or not is performed by a CPU/GPU, the thread number refers to a minimum unit for a computation scheduling, one thread refers to a single-sequence control flow in a process, multiple threads may be parallelly performed in one process, and each thread parallelly performs different tasks. That is, a scheduling of the computation node may be performed once in one thread number. A CPU/GPU in the related art is a multi-thread processor, so that multiple schedules are performed at the same time, and thus the computing efficiency is improved. The preset thread number is a number of idle threads in the CPU/GPU, the preset thread number is changed in real time according to the scheduling condition, and when one thread completes a scheduling once, the thread is an idle thread, and a next scheduling operation may be performed. In a case where the preset thread number is greater than zero, it is represented that the CPU/GPU may perform a scheduling of the to-be-computed node, and therefore the node type of the to-be-computed node is determined. Scheduling of several nodes to be computed may be performed when the preset thread number is several. The hardware computation node is a computation node where the hardware computing power module may perform the computing, and the software computation node is a computation nodes where the hardware computing power module cannot perform the computing. The hardware computing power module may include multiple AI computing power chips, the AI computing power chip employs a data flow architecture, and may only perform the computing for a specific computation node, but the AI computing power chip is very high in computation efficient.

In step S210, in a case where the preset thread number is equal to zero, the to-be-computed node is set to be in a waiting state until the preset thread number is greater than zero.

In this embodiment, in a case where the preset thread number is equal to zero, it is represented that the CPU/GPU cannot perform a scheduling of the to-be-computed node, the to-be-computed node is changed into the waiting state, and the node type of the to-be-computed node is determined until the preset thread number is greater than zero.

In step S300, in a case where the node type is the hardware computation node, the hardware computation node is scheduled to a first queue, and whether a hardware computing power module corresponding to the hardware computation node is occupied or not is determined.

In this embodiment, the first queue is a hardware node queue, and all nodes to be computed entering the first queue are hardware calculation nodes. Each AI computing power chip in the hardware computing power module may be designed for computing different hardware computation nodes, and in a case where the to-be-computed node is the hardware computation node, whether an AI computing power chip corresponding to the hardware computation node is occupied or not needs to be determined.

In step S310, in a case where the hardware computing power module is not occupied, the hardware computation node is input into the hardware computing power module for computing.

In an embodiment, in a case where the to-be-computed node is the hardware computation node, and when an AI computing power chip corresponding to the hardware computation node is not occupied, the hardware computation node is input into the hardware computing power module and the AI computing power chip corresponding to the hardware computation node for computing. In step S311, in a case where the hardware computing power module is occupied, the hardware computation node is input into a software computing power module for computing.

In this embodiment, in a case where the to-be-computed node is the hardware computation node, but an AI computing power chip corresponding to the hardware computation node is occupied, the hardware computation node is input into the software computing power module for computing. The software computing power module is a CPU/GPU, and the CPU/GPU adopts an instruction set architecture and may perform computing of all types of computation nodes, but the computing efficiency is low. In a case where the hardware computation node cannot be computed by the hardware computing power module, the hardware computation node is scheduled to the software computing power module for computing, so that the hardware computing power module cannot be in an idle state when the hardware computation node exists; in a case where the hardware computation node exists and the hardware computing power module is also occupied, the hardware computation node is scheduled to the software computing power module, so that a condition that the hardware computation node is blocked and queued in a case where the hardware computing power module is occupied is guaranteed; only in a case where both the hardware computing power module and the software computing power module are occupied, the hardware computation node is blocked and queued.

In step S320, whether a subsequent computation node subsequent to a hardware computation node completing a computation exists or not is determined.

In this embodiment, each computation node has a data dependency relationship, and after the computing of one computation node is completed, the subsequent computation node may be computed.

In step S321, in a case where the subsequent computation node exists, the subsequent computation node is preferentially scheduled, and then the computation of the subsequent computation node is restarted from the step S200.

In step S322, in a case where the subsequent computation node does not exist, after a thread currently occupied by the hardware computation node completing the computation is released, the operation is restarted from the step S210.

In this embodiment, after computation of the hardware computation node is completed, in a case where the subsequent computation node of to be computed exists, the subsequent computation node is preferentially scheduled to continue to compute, that is, the thread of the hardware computation node is scheduled to continue to schedule the subsequent computation node of the computation node, and the step S200 is repeatedly performed. However, whether the preset thread number is greater than zero or not does not need to be determined in a process of performing the step S200, and whether it is the hardware computation node or not is directly determined, the steps are repeated until no subsequent computation node exists, the thread currently occupied by the hardware computation node completing the computation is released, the operation is restarted from the step S210, other nodes to be computed are notified in a waiting state to perform the computation through the thread, and a determination on the node type of the to-be-computed node is performed.

In step S400, in a case where the node type is the software computation node, the software computation node is scheduled to a second queue, and whether an unoccupied software computing power module exists or not is determined.

In an embodiment, the second queue is a software node queue, and all nodes to be computed entering the second queue are software computation nodes. The software computation node may perform the computation only through the CPU/GPU.

In step S410, in a case where the unoccupied software computing power module exists, the software computation node is input into the software computing power module for computing.

In step S411, in a case where the unoccupied software computing power module does not exist, the software computation node is configured to be in a waiting state until the unoccupied software computing power module exists.

In step S420, whether a subsequent computation node of a hardware computation node completing a computation exists or not is determined.

In step S421, in a case where the subsequent computation node exists, the subsequent computation node is preferentially scheduled, and then the computation of the subsequent computation node is restarted from the step S200.

In step S422, in a case where the subsequent computation node does not exist, a thread currently occupied by the software computation node completing the computation is released, and the operation is restarted from the step S210.

In this embodiment, after computation of the software computation node is completed, in a case where the subsequent computation node subsequent to the software computation node exists, the subsequent computation node is preferentially scheduled to continue to compute, that is, the thread of the hardware computation node is scheduled to continue to schedule the subsequent computation node of the computation node, and the step S200 is repeatedly performed; however, whether the preset thread number is greater than zero or not does not need to be determined in a process of performing the step S200, and whether it is the hardware computation node or not is directly determined, the steps are repeated until no subsequent computation node exists, the thread currently occupied by the software computation node completing the computation is released, the operation is restarted from the step S210, other nodes to be computed are notified in a waiting state to perform the computation through the thread, and a determination on the node type of the to-be-computed node is performed.

Figure 3:
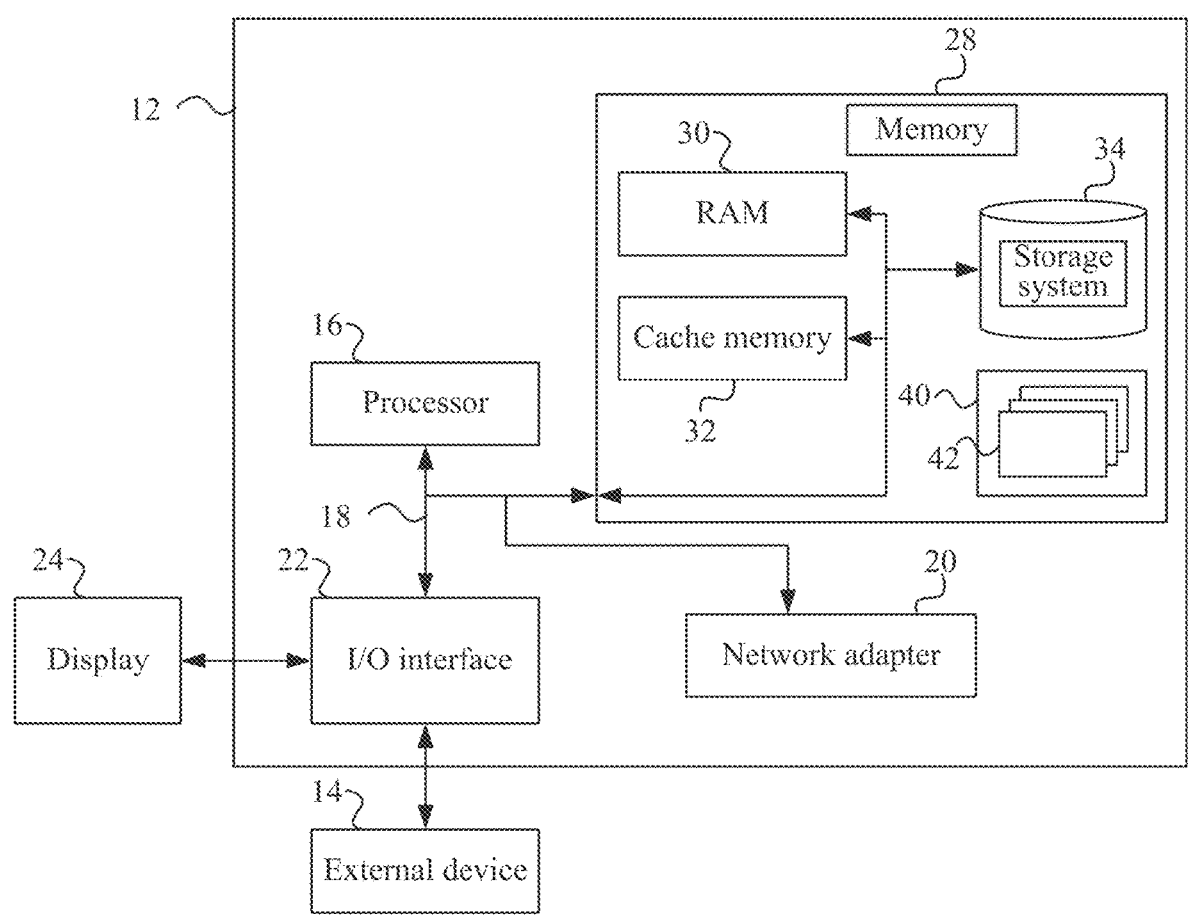
FIG. 3 is a structural diagram of a scheduling device based on a deep learning node computation provided in an embodiment of the present application.

FIG. 3 is a structural diagram of a scheduling device based on a deep learning node computation provided in an embodiment of the present application. FIG. 3 shows a block diagram of an exemplary scheduling device 12 based on a deep learning node computation suitable for use in implementing the embodiments of the present application. The scheduling device 12 based on the deep learning node computation shown in FIG. 3 is merely an example and should not impose any limitation on the functionality and scope of use of the embodiments of the present application. As shown in FIG. 3, the scheduling device 12 based on the deep learning node computation is represented in a form of a general purpose computing device. A component of the scheduling device 12 based on the deep learning node computation may include, but is not limited to, at least one processor or processing unit 16, a storage apparatus 28, and a bus 18 connecting different system assemblies (including the storage apparatus 28 and the processing unit 16).

The bus 18 represents at least one of several types of bus structures, including a memory bus or a memory controller, a peripheral bus, an accelerated graphics port, a processor, or a local bus using any of a variety of bus structures. For example, such architectures include, but not limited to, an industry standard architecture (ISA) bus, a micro channel architecture (MAC) bus, an enhanced ISA bus, a video electronics standards association (VESA) local bus, and a peripheral component interconnect (PCI) bus.

The scheduling device 12 based on the deep learning node computation typically includes a variety of computer system readable media. These media may be any available media that may be accessed by the scheduling device 12 based on the deep learning node computation, and these media include both volatile and nonvolatile media, removable and non-removable media.

The storage apparatus 28 may include a computer system readable medium in a form of a volatile memory, such as a random access memory (RAM) 30 and/or a cache memory 32. The scheduling device 12 based on the deep learning node computation may include other removable/non-removable, volatile/nonvolatile computer system storage media. By way of example only, a storage system 34 may provide a hard disk drive (not shown in FIG. 3) for reading from and writing to non-removable, nonvolatile magnetic media. Although not shown in FIG. 3, a magnetic disk drive for reading from and writing to a removable, non-volatile magnetic disk (such as "floppy disk"), and an optical disk drive for reading from and writing to a removable, non-volatile optical disk (such as, a compact disc-read only memory (CD-ROM), a digital video disc-read only memory (DVD-ROM), or other optical media) may be provided. In such instances, each drive may be connected to the bus 18 through at least one data media interface. The memory 28 may include at least one program product having a set (e.g., at least one) of program modules, and these program modules are configured to perform the functions of the embodiments of the present application.

A program/utility tool 40 having a set (at least one) of program modules 42 may be stored, for example, in the memory 28, such program modules 42 include, but not limited to, an operating system, at least one application program, other program modules, and program data, each or some combination of these examples may include an implementation of a network environment. The program modules 42 generally perform the functions and/or methodologies in the embodiments described in the present application.

The scheduling device 12 based on the deep learning node computation may communicate with at least one external device 14 (such as, a keyboard, a pointing device, a display 24), and may also communicate with at least one device that enables a user to interact with the scheduling device 12 based on the deep learning node computation, and/or may also communicate with any device (such as a network card, a modem) that enables the scheduling device 12 based on the deep learning node computation to communicate with at least one other computing device. Such communication may occur via an input/output (I/O) interface 22. Moreover, the scheduling device 12 based on the deep learning node computation may also be in communicate with at least one network (such as a local area network (LAN), a wide area network (WAN), and/or a public network such as the Internet) through a network adapter 20. As shown, the network adapter 20 communicates with other modules of the scheduling device 12 based on the deep learning node computation via the bus 18. It should be appreciated that although not shown in FIG. 3, other hardware and/or software modules may be used in conjunction with the scheduling device 12 based on the deep learning node computation, and the hardware and/or software modules include, but not limited to: microcode, device drivers, redundant processing units, external disk drive arrays, redundant arrays of independent disks (RAID) systems, tape drives, and data backup storage systems, among others. The processing unit 16 executes various functional applications and data processing by running a program stored in the storage apparatus 28, for example, implements the scheduling method provided in the embodiments of the present application, this method includes: a to-be-computed node of a preset neural network computation graph is acquired; whether a preset thread number is greater than zero or not is determined, and a node type of the to-be-computed node is determined in a case where the preset thread number is greater than zero, where the node type includes a hardware computation node and a software computation node; in a case where the preset thread number is equal to zero, the to-be-computed node is set to be in a waiting state until the preset thread number is greater than zero; in a case where the node type is the hardware computation node, the hardware computation node is scheduled to a first queue, and whether a hardware computing power module corresponding to the hardware computation node is occupied or not is determined; in a case where the hardware computing power module is not occupied, the hardware computation node is input into the hardware computing power module for computing; in a case where the hardware computing power module is occupied, the hardware computation node is input into a software computing power module for computing; whether a subsequent computation node subsequent to a hardware computation node completing a computation exists or not is determined; in a case where the subsequent computation node exists, after the subsequent computation node is preferentially scheduled, the computation of the subsequent computation node is restarted from the step "whether the preset thread number is greater than zero or not is determined, and the node type of the to-be-computed node is determined in a case where the preset thread number is greater than zero, where the node type includes the hardware computation node and the software computation node"; in a case where the subsequent computation node does not exist, after a thread currently occupied by the hardware computation node completing the computation is released, the operation is restarted from the step "in a case where the preset thread number is equal to zero, the to-be-computed node is configured to be in the waiting state until the preset thread number is greater than zero"; in a case where the node type is the software computation node, the software computation node is scheduled to a second queue, and whether an unoccupied software computing power module exists or not is determined; and in a case where the unoccupied software computing power module exists, the software computation node is input into the software computing power module for computing; in a case where the unoccupied software computing power module does not exist, the software computation node is configured to be in a waiting state until the unoccupied software computing power module exists; whether a subsequent computation node subsequent to a hardware computation node completing a computation exists or not is determined; and in a case where the subsequent computation node exists, after the subsequent computation node is preferentially scheduled, the computation of the subsequent computation node is restarted from the step "whether the preset thread number is greater than zero or not is determined, and the node type of the to-be-computed node is determined in a case where the preset thread number is greater than zero, where the node type includes the hardware computation node and the software computation node"; and in a case where the subsequent computation node does not exist, a thread currently occupied by the software computation node completing the computation is released, the operation is restarted from the step" in a case where the preset thread number is equal to zero, the to-be-computed node is configured to be in the waiting state until the preset thread number is greater than zero".

An embodiment of the present application further provides a computer-readable storage medium, a computer program is stored in the computer-readable storage medium, and the computer program, when executed by a processor, implements the scheduling method provided in all embodiments of the present application, this method includes the following: a to-be-computed node of a preset neural network computation graph is acquired; whether a preset thread number is greater than zero or not is determined, and a node type of the to-be-computed node is determined in a case where the preset thread number is greater than zero, where the node type includes a hardware computation node and a software computation node; in a case where the preset thread number is equal to zero, the to-be-computed node is set to be in a waiting state until the preset thread number is greater than zero; in a case where the node type is the hardware computation node, the hardware computation node is scheduled to a first queue, and whether a hardware computing power module corresponding to the hardware computation node is occupied or not is determined; in a case where the hardware computing power module is not occupied, the hardware computation node is input into the hardware computing power module for computing; in a case where the hardware computing power module is occupied, the hardware computation node is input into a software computing power module for computing; whether a subsequent computation node subsequent to a hardware computation node completing a computation exists or not is determined; in a case where the subsequent computation node exists, after the subsequent computation node is preferentially scheduled, the computation of the subsequent computation node is restarted from the step "whether the preset thread number is greater than zero or not is determined, and the node type of the to-be-computed node is determined in a case where the preset thread number is greater than zero, where the node type includes the hardware computation node and the software computation node"; in a case where the subsequent computation node does not exist, after a thread currently occupied by the hardware computation node completing the computation is released, the operation is restarted from the step "in a case where the preset thread number is equal to zero, the to-be-computed node is set to be in the waiting state until the preset thread number is greater than zero"; in a case where the node type is the software computation node, the software computation node is scheduled to a second queue, and whether an unoccupied software computing power module exists or not is determined; and in a case where the unoccupied software computing power module exists, the software computation node is input into the software computing power module for computing; in a case where the unoccupied software computing power module does not exist, the software computation node is set to be in a waiting state until the unoccupied software computing power module exists; whether a subsequent computation node subsequent to a hardware computation node completing a computation exists or not is determined; and in a case where the subsequent computation node exists, after the subsequent computation node is preferentially scheduled, the computation of the subsequent computation node is restarted from the step" whether the preset thread number is greater than zero or not is determined, and the node type of the to-be-computed node is determined in a case where the preset thread number is greater than zero, where the node type includes the hardware computation node and the software computation node"; and in a case where the subsequent computation node does not exist, a thread currently occupied by the software computation node completing the computation is released, the operation is restarted from the step "in a case where the preset thread number is equal to zero, the to-be-computed node is configured to be in the waiting state until the preset thread number is greater than zero".

The computer storage media of the embodiments of the present application may adopt any combination of at least one computer-readable medium. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. More specific examples (a non-exhaustive list) of the computer-readable storage medium include: an electrical connection having at least one wire, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In this context, the computer-readable storage medium may be any tangible medium that contains or stores a program for use by or in connection with an instruction execution system, apparatus, or device.

The computer-readable signal medium may include a propagated data signal with a computer readable program code carried therein, for example, in a baseband or as a part of a carrier wave. Such a propagated data signal may adopt a variety of forms, including, but not limited to: an electromagnetic signal, an optical signal, or any suitable combination of the foregoing. The computer-readable signal medium may be any computer-readable medium that is not a computer-readable storage medium and that may transmit, propagate, or transport a program for use by or in connection with an instruction execution system, apparatus, or device.

Program codes embodied on the computer-readable medium may be transmitted using any appropriate medium, including but not limited to: wireless, wire, optic cable, RF, etc., or any suitable combination of the foregoing.

A computer program code for performing the operations of the present application may be written in at least one programming languages or combinations thereof, the described programming languages include an object-oriented programming language—such as Java, Smalltalk, C++, and further include a conventional procedural programming language—such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

What is claimed is:

1. A scheduling method based on a deep learning node computation, comprising:
    acquiring a to-be-computed node of a preset neural network computation graph;
    determining a node type of the to-be-computed node, wherein the node type comprises a hardware computation node and a software computation node;
    in a case where the node type is the hardware computation node, scheduling the hardware computation node to a first queue, and determining whether a hardware computing power module corresponding to the hardware computation node is occupied or not; and
    in a case where the hardware computing power module is not occupied, inputting the hardware computation node into the hardware computing power module for computing;
    wherein the determining the node type of the to-be-computed node comprises determining whether a preset thread number is greater than zero, and determining the node type of the to-be-computed node in a case where the preset thread number is greater than zero.

2. The scheduling method of claim 1, further comprising:
    in a case where the hardware computing power module is occupied, inputting the hardware computation node into a software computing power module for computing.

3. The scheduling method of claim 1, further comprising:
    in a case where the node type is the software computation node, scheduling the software computation node to a second queue, and determining whether an unoccupied software computing power module exists or not; and
    in a case where the unoccupied software computing power module exists, inputting the software computation node into the software computing power module for computing.

4. The scheduling method of claim 3, further comprising:
    in a case where the unoccupied software computing power module does not exist, configuring the software computation node to be in a waiting state until the unoccupied software computing power module exists.

5. The scheduling method of claim 3, wherein after in a case where the unoccupied software computing power module exists, inputting the software computation node into the software computing power module for computing, the method comprises:
    determining whether a subsequent computation node exists in a software computation node completing a computation or not; and
    in a case where the subsequent computation node exists, preferentially scheduling the subsequent computation node to continue the computation, and in a case where the subsequent computation node does not exist, releasing a thread currently occupied by the software computation node completing the computation.

6. The scheduling method of claim 1, wherein after in a case where the hardware computing power module is not occupied, inputting the hardware computation node into the hardware computing power module for computing, the method comprises:
    determining whether a subsequent computation node exists in a hardware computation node completing a computation or not; and
    in a case where the subsequent computation node exists, preferentially scheduling the subsequent computation node to continue the computation, and in a case where the subsequent computation node does not exist, releasing a thread currently occupied by the hardware computation node completing the computation.

7. The scheduling method of claim 1, further comprising:
    in a case where the preset thread number is equal to zero, configuring the to-be-computed node to be in a waiting state until the preset thread number is greater than zero.

8. A scheduling device based on a deep learning node computation, comprising:
    at least one processor;
    a storage apparatus, which is configured to store at least one program, wherein the at least one program, when executed by the at least one processor, causes the at least one processor to implement the scheduling method, wherein the scheduling method comprises:
    acquiring a to-be-computed node of a preset neural network computation graph;
    determining a node type of the to-be-computed node, wherein the node type comprises a hardware computation node and a software computation node;
    in a case where the node type is the hardware computation node, scheduling the hardware computation node to a first queue, and determining whether a hardware computing power module corresponding to the hardware computation node is occupied or not; and
    in a case where the hardware computing power module is not occupied, inputting the hardware computation node into the hardware computing power module for computing;

wherein the determining the node type of the to-be-computed node comprises determining whether a preset thread number is greater than zero, and determining the node type of the to-be-computed node in a case where the preset thread number is greater than zero.

9. A non-transitory computer-readable storage medium, having stored thereon a computer program, wherein the computer program, when executed by a processor, implements the scheduling method of claim 1.

\* \* \* \* \*